United States Patent

Hodgson et al.

[11] 4,294,805
[45] Oct. 13, 1981

[54] METHOD OF LEACHING THE CONTENTS OF A CAN

[75] Inventors: Thomas D. Hodgson; Tony W. J. Jordan, both of Abingdon, England

[73] Assignee: United Kingdom Atomic Energy Authority, London, England

[21] Appl. No.: 64,911

[22] Filed: Aug. 8, 1979

[30] Foreign Application Priority Data

Aug. 9, 1978 [GB] United Kingdom ............... 32747/78

[51] Int. Cl.³ ............................................. C01G 43/00
[52] U.S. Cl. ................................ 423/4; 252/301.1 R; 423/20; 423/395; 423/658.5
[58] Field of Search ............... 423/4, 20, 395, 658.5; 75/101 R; 204/1.5; 252/301.1 R

[56] References Cited

U.S. PATENT DOCUMENTS

| | | | |
|---|---|---|---|
| 891,459 | 6/1908 | Caldecott | 75/101 R |
| 2,616,820 | 11/1952 | Bourgeaux | 75/101 R |
| 2,827,405 | 3/1958 | Evans et al. | 423/4 |
| 2,992,886 | 7/1961 | Gens | 423/4 |
| 3,089,751 | 5/1963 | Beaver et al. | 423/4 |
| 3,119,658 | 1/1964 | Schulz | 423/395 |
| 3,341,304 | 9/1967 | Newby | 423/4 |
| 3,485,594 | 12/1969 | Knacke et al. | 423/4 |
| 3,679,378 | 7/1972 | Impe et al. | 204/1.5 |
| 4,071,278 | 1/1978 | Carpenter et al. | 423/658.5 |
| 4,168,295 | 9/1979 | Sawyer | 423/658.5 |
| 4,174,369 | 11/1979 | John | 423/4 |

FOREIGN PATENT DOCUMENTS 805547 12/1958 United Kingdom .

Primary Examiner—Edward A. Miller
Attorney, Agent, or Firm—Larson and Taylor

[57] ABSTRACT

A method of leaching a material from a cavity having a closed or a partially closed top. The method consists of subjecting the liquid to a number of pressure cycles, each pressure cycle involving a decrease in pressure to cause boiling of the liquid, followed by a rise in pressure to inhibit the boiling. The method may include the step of heating the liquid to a temperature near to its boiling point.

7 Claims, 4 Drawing Figures

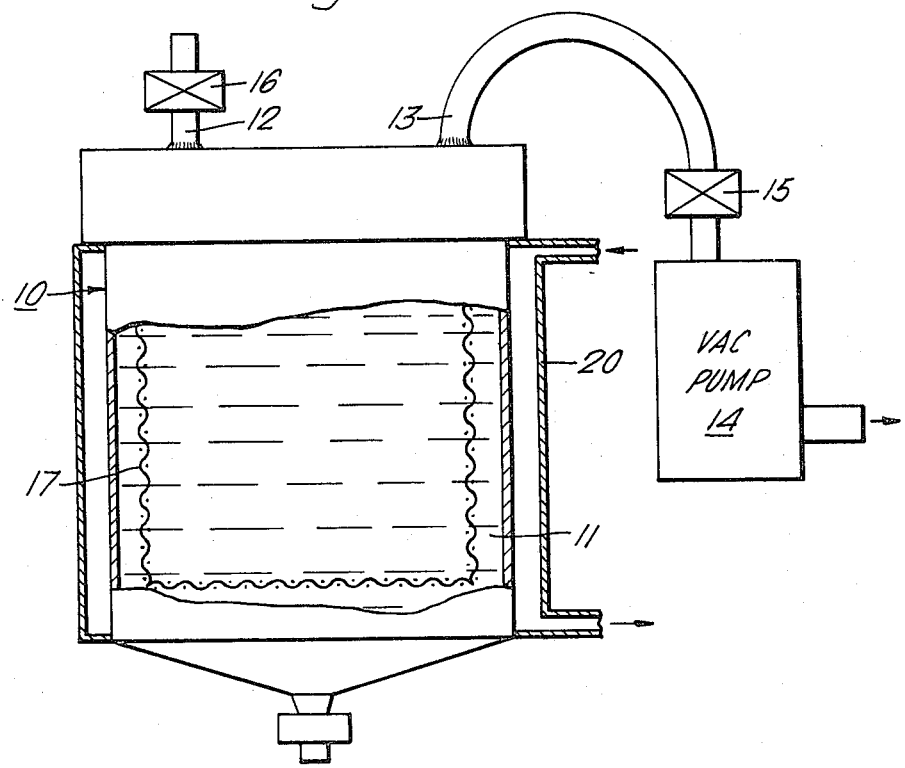
Fig. 1.
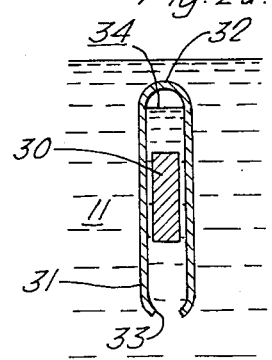
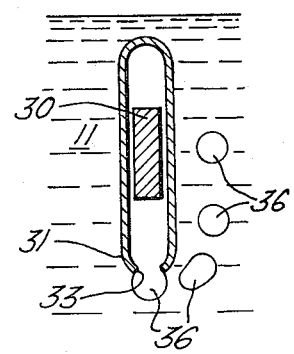
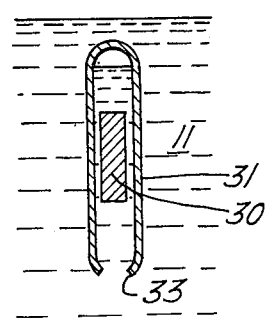
Fig. 2a.  Fig. 2b.  Fig. 2c.

METHOD OF LEACHING THE CONTENTS OF A CAN

This invention relates to a method of leaching material from a cavity, and more particularly but not exclusively to a method of reprocessing nuclear fuel, for example in an acid dissolver in which nuclear fuel materials and fission products are dissolved out of chopped pieces of nuclear fuel pins i.e. nuclear fuel material clad with a material such as a stainless steel nuclear fuel can.

It is usual to chop each fuel pin into small lengths, typically 25.4 mm (1.0 ins) or 50.8 mm (2.0 ins) long, and to collect a number of chopped pieces in a perforated basket and immerse them in boiling or near boiling nitric acid. The acid leaches out the nuclear fuel materials and fission products and leaves behind empty hulls (empty nuclear fuel cans).

One of the problems encountered is that, because the hulls are located randomly in the acid bath, some of the hulls are oriented in such a position that the initial air and any gas evolved becomes trapped inside the hulls. The gas "blanket" so formed between the solvent acid and the nuclear fuel material prevents fresh acid from reaching the nuclear fuel material and therefore reduces the effectiveness of the process. This problem is accentuated with the end pieces of the fuel pins that are blanked-off at one end. Furthermore, because of the need to chop the fuel pins into very short lengths to expose the fuel to the solvent, the shearing tools employed to chop the fuel pins quickly become blunt, and the more blunt they become the less clean is the cut, and thus the shearing tools tend to crimp over the ends of the nuclear fuel can at the shear face with the result that gas evolved during dissolution of the fuel material becomes trapped inside the hull.

One form of nuclear reactor nuclear fuel pin has a central longitudinally extending hole through at least part of the length of the nuclear fuel therein, and an alternative to chopping such a fuel pin into small pieces is to cut as a single length the entire portion of the fuel pin that contains nuclear fuel having the central hole therethrough and placing that length upright without further sub-division into the dissolver so that dissolution of the nuclear fuel is aided by a gas-lift effect which circulates acid through the central hole as the chemical reaction occurs. However, the central hole might be blocked by encroached nuclear fuel or by fission products thus forming a cavity having a closed top, and a similar effect would be produced to that described above in relation to the small lengths of the fuel pins, in that circulation of the acid would be blocked through the central hole and a gas "blanket" would be formed between the acid and the blanketed nuclear fuel.

Another problem is that a leaching liquid that does not evolve a gas and becomes trapped in a cavity would most likely eventually become saturated with the material before complete removal of the material from the cavity.

According to one aspect of the present invention, there is provided a method of leaching a material with a liquid from a cavity, the method comprising contacting the material with the liquid and subjecting the liquid to a plurality of pressure cycles, each pressure cycle comprising, a decrease in pressure to cause boiling of the liquid, and an increase in pressure from the decreased pressure to inhibit the boiling of the liquid.

The cavity may have a closed top and an open lower end thereof.

Means may be provided for heating the liquid to a temperature at which the liquid boils at said decreased pressure.

The decreased pressure may be between $\frac{1}{2}''$ to $12''$ Hg below atmospheric pressure, and the increased pressure might be at or near atmospheric pressure.

The period of the decreased pressure part of said cycle may be from 1 to about 30 seconds, and the period of the rise part of said cycle may be from 1 to about 30 seconds.

Desirably, the cycle is repeated at a rate of from 1 to 4 cycles per minute.

The invention has one application in the leaching of irradiated nuclear fuel material from chopped lengths of nuclear fuel pins, the chopped pins being immersed in a vessel containing near boiling nitric acid, and the vessel being subjected to pressure cycling in accordance with the method of the invention.

The invention will now be further described by way of example only, with reference to the accompanying drawings in which:

FIG. 1 shows a side, partly broken away, diagrammatic representation of an apparatus for dissolving irradiated nuclear fuel materials;

FIGS. 2a to 2c each shows a side diagrammatic fragmentary sectional representation of a chopped length of a nuclear fuel pin in the apparatus of FIG. 1.

Referring now to FIG. 1, the apparatus shown is of circular form in plan and comprises a fluid tight vessel 10 made of stainless steel and containing nitric acid 11. The vessel 10 has a gas vent 12 with a valve 16, and a connection 13 to a vacuum pump 14 having an isolating valve 15. The vacuum pump 14 is provided for subjecting the acid 11 to a pressure cycle whereby the pressure inside the vessel 10 is reduced from atmospheric pressure to a pressure of about 6 inches of mercury ($20 \times 10^{-3} N/m^2$) below atmospheric pressure when valve 15 is opened, and rises back to atmospheric pressure by opening inlet valve 16 and closing valve 15. A heating jacket 20 through which steam or hot pressurised water is arranged to be circulated, surrounds the vessel 10 so as to heat the acid 11 near to its boiling point ($\sim 100°$ C.). A stainless steel mesh carrier 17 for containing the nuclear fuel material locates in the vessel 10. The whole of the apparatus is contained in a biological shield (not shown) to protect personnel from the effects of radiation from the irradiated nuclear fuel materials.

In operation, chopped lengths of nuclear fuel pins are loaded into the carrier 17 and immersed in the acid 11 which has been heated by the heating jacket 20 to a temperature of about $100°$ C. With valve 15 open and the gas vent valve 16 closed, the space above the acid 11 is evacuated by the vacuum pump 14 to a pressure of 6 inches of mercury ($20 \times 10^{-3} N/m^2$) below atmospheric pressure.

Valve 15 is then closed and the gas vent valve 16 opened to allow the pressure in the vessel 10 to rise to atmospheric pressure. The rate of change of the pressure inside the vessel 10 can be controlled by the valve 15 and the gas vent valve 16 to produce a required period for the pressure cycle.

The effect of the above pressure cycle will now be described in relation to FIGS. 2a to 2c, and referring to FIG. 2a the chopped length of nuclear fuel pin shown comprises a uranium oxide body 30 inside a stainless steel hull 31 having a closed end 32 uppermost and an open partially turned-in lower end 33 through which the acid 11 has entered to a level 34. At atmospheric pressure and with the acid 11 at about 100° C., the acid 11 reacts with the body 30 and generates a gas and produces heat of reaction. Some of the acid 11 vaporises into the gas phase, and the gas and the vapour displace acid 11 from the hull 31 thus exposing some of the surface of the body 30, and the acid 11 inside the hull 31 becomes loaded with dissolved solute.

When the pressure is reduced below atmospheric pressure as aforedescribed, the acid 11 boils so that the gas and the vapour inside the hull 31 expand and gas is released from solution in the acid 11, and vapour is generated using excess heat in solution for vaporization. The combined effect of the evolution and the expansion of the gas and the vapour as shown in FIG. 2b, is that the acid 11 is displaced from the hull 31 and excess gas and vapour escape as bubbles 36 from the lower end 33 of the hull 31.

On the pressure being returned to atmospheric pressure, the gas is forced into solution again in the acid 11 by the effect of the increased pressure, and the vapour condenses giving up its latent heat and superheating the acid 11 in the hull 31. The collapse of the gas and the vapour in the hull 31 draws fresh acid 11 into the hull 31 as shown in FIG. 2c to renew the attack on the body 30.

Without the effect of the above pressure cycle, the gas would eventually fill the hull 31 and stop further chemical attack of the body 30. If at the start of the pressure cycle the hull 31 contains a gas such as air which remains relatively inert during the chemical reaction, the inert gas will be gradually displaced from the hull 31 with the vapour and any reaction gases.

A series of pressure cycles were carried out during the leaching of several nuclear materials, and the results are set out in Table 1 below in which:

Sd = pressure reduced in 6 seconds to 6" Hg below atmospheric pressure.
Su = pressure restored to atmospheric pressure in 14 seconds.
Fd = pressure reduced to 6" Hg below atmospheric pressure in 1 second.
Fu = pressure resored to atmospheric pressure in 1 second.

A pulse form "4 Sd Fu" for example means 4 pulses per minute in which the pressure was reduced in 6 seconds, restored in 1 second, and then held for 8 seconds until the next pulse, to provide the required pulse rate.
Acid = 8 M HNO₃ at about 100° C.
U(dep) = UO₂ pellets made from depleted uranium.
U(nat) ann = UO₂ annular pellets made from natural uranium.
U(nat) solid = UO₂ solid pellets made from natural uranium.
ThO₂ = annular pellets of 30% ThO₂, 70% UO₂.
PuO₂ = annular pellets of 30% PuO₂, 70% UO₂.

A stainless steel hull containing the nuclear material was held vertically, and had a closed end uppermost and an open lower end.

TABLE 1

| Test | Pellet Type | Hull Length | Pulse | % Dissolved ½ hr | 1 hr | 2 hr |
|---|---|---|---|---|---|---|
| 1 | U/dep) | 1 in | No | 2.5 | | |
| 2 | " | " | 2SdSu | 25.1 | | |
| 3 | " | " | 3SdSu | 26.6 | | |
| 4 | " | " | 2SdFu | 30.3 | | |
| 5 | " | " | 3SdFu | 35.4 | | |
| 6 | " | " | 4FdFu | 27.9 | | |
| 7 | ThO₂ | " | No | 1.7 | | |
| 8 | " | " | 4SdFu | 35.7 | | |
| 9 | PuO₂ | " | No | | 2.9 | |
| 10 | " | " | 4SdFu | | 27.3 | |
| 11 | U(dep) | 3 in | No | 1.1 | | |
| 12 | " | " | 2SdSu | 5.2 | | |
| 13 | " | " | 3SdSu | 1.3 | | |
| 14 | " | " | 2SdFu | 17.6 | | |
| 15 | " | " | 4SdFu | 25.7 | | |
| 16 | " | " | 4FdFu | 28.0 | | |
| 17 | " | " | No | 0.5 | Single pellet held at top of Hull | |
| 18 | " | " | 4SdFu | 22.6 | | |
| 19 | " | " | No | 5.7 | | |
| 20 | " | " | 4SdFu | 17.2 | | |
| 21 | U(nat) ann | " | No | 1.0 | | |
| 22 | " | " | 4SdFu | 85.7 | | |
| 23 | U(nat) solid | " | No | 5.3 | | |
| 24 | " | " | 4SdFu | 36.6 | | |
| 25 | PuO₂ | " | No | | 2.0 | |
| 26 | " | " | 4SdFu | | 12.6 | |
| 27 | U(dep) | 12 in | No | <0.2 | | |
| 28 | " | " | 4SdFu | 12.2 | | |
| 29 | " | " | 4SdFu | | | 37.7 |

The effect of pressure cycling can be seen from the Table by comparing the dissolution rate without pressure cycling with that achieved using various pressure cycles. In most of the tests, increasing the pulse rate to 4 pulses/minute, and restoring the pressure rapidly to atmospheric pressure, increases the dissolution rate of the nuclear fuel pellets. The effect of the invention in improving the penetrating ability of the acid inside the hull can be seen particularly from Tests 17 and 18, since without pressure cycling there was almost no dissolution, whereas with pressure cycling substantial dissolution occurred.

Similar tests have indicated that a substantial increase in the dissolution rate can be obtained at a pressure cycle of from atmospheric pressure to about 4" Hg below atmospheric pressure. Pressure cycles having a decreased pressure down to about 10" to 12" Hg below atmospheric pressure might be used at a cycle period of up to 1 to 2 minutes, the limits of the pressure cycle depending upon technical and economic factors with respect to a particular plant. It is likely that pressure cycles of less than about ½" Hg would have a negligible influence on the dissolution rate.

Pressure cycling in accordance with the invention between other pressures than those mentioned above may be appropriate for some applications, for example to provide the same pressure cycle but with the increased pressure part above atmospheric pressure, the cycle being produced by the application of a pressurized gas to the vessel.

It will be understood that the invention may be used in the leaching of a non-nuclear material, for example the leaching using hydrochloric acid of a trapped body of calcium carbonate, the results being shown in Table 2 below, in which:

TABLE 2

Sd ⎫
Fu ⎭ represent the same values as those set out in relation to Table I

Acid - 0.5M HCl - Temperature 95° C.
Pellet type - CaCO₃ annular pellets

TABLE 2-continued

| Test | Hull Length | Pulse | % Dissolved ½ hr |
|---|---|---|---|
| 1 | 1 in | No | <0.02 |
| 2 | " | 4 SdFu | 8.4 |

The invention also has applications in the leaching of a material with a liquid which does not evolve a gas when it contacts the material. During pressure cycling, the variations in vapour pressure would cause cyclic downward displacement of the liquid, and thus the ejection of some of the solute from the cavity and the ingress of liquid into the cavity. Without such pressure cycling, the rate of leaching of the material would fall as the liquid in the cavity became saturated with the material.

It will be appreciated that the cavity into which a liquid has to penetrate to leach a material might be defined by the material itself, for example by a porous body of the material.

Furthermore, the cavity might have a closed lower end and a top having a relatively restricted opening, such that surface tension effects might inhibit the passage of the liquid through the opening, for example an aluminium hull having a top with an opening not exceeding about 4.0 mm × 12.5 mm and to be penetrated by an aqueous solution at about 100° C.

The invention may be used in alternative apparatus to that described herein, and such apparatus, for example, might use an ejector instead of a vacuum pump to produce the required pressure cycle.

We claim:

1. A method of leaching material from a composite body with a liquid dissolvent which evolves a gas on contacting the material, the composite body comprising the material to be leached located in a tubular can, said can being insoluble in the dissolvent and open at one end thereof to expose said material, the method comprising placing the body in a vessel containing a said liquid dissolvent for the material and heating the vessel to a temperature near to the boiling point of the dissolvent, and then subjecting the vessel to a plurality of pressure cycles, each pressure cycle comprising, firstly, reducing the pressure inside the vessel using a vacuum source connected to the vessel so as to cause boiling of the dissolvent, and subsequently, introducing a gas into the vessel through a vent means of the vessel so as to increase the pressure inside the vessel from the reduced pressure therein to inhibit the boiling of the dissolvent, thereby to displace from partially enclosed cavities in said body during the reduced pressure portions of the cycles evolved gas entrapped in said cavities.

2. A method as claimed in claim 1, wherein the decreased pressure is between 4" to 6" Hg below atmospheric pressure.

3. A method as claimed in claim 1, wherein the period of the decreased pressure part of said cycle is from about 1 to 30 seconds.

4. A method as claimed in claim 1, wherein the period of the increased pressure part of said cycle is from about 1 to 30 seconds.

5. A method as claimed in claim 1, wherein the cycle is repeated at a rate of from 1 to 4 cycles per minute.

6. A method of leaching material from a composite body with a liquid dissolvent which evolves a gas on contacting the material, the composite body comprising the material to be leached located in a tubular can, said can being insoluble in the dissolvent and open at one end thereof to expose said material, the method comprising placing the body in a vessel containing a said liquid dissolvent for the material and heating the vessel to cause boiling of the dissolvent, and then subjecting the vessel to a plurality of pressure cycles, each pressure cycle comprising, firstly introducing a gas into the vessel to increase the pressure inside the vessel so as to inhibit the boiling of the dissolvent, and subsequently venting the gas from the vessel to reduce the pressure therein and cause boiling of the dissolvent, thereby to displace from partially enclosed cavities in the body during the reduced pressure portions of the cycles evolved gas entrapped in said cavities.

7. A method of leaching irradiated nuclear material and fission products from at least one length cut from an irradiated nuclear fuel element said fuel element comprising said nuclear material clad with a metal can, the method comprising placing the cut length of the fuel element into a vessel containing nitric acid and heating the vessel near to the boiling point of the nitric acid, and subjecting the vessel to a plurality of pressure cycles, each pressure cycle comprising, firstly, reducing the pressure inside the vessel using a vacuum source connected to the vessel so as to cause boiling of the nitric acid, and subsequently, introducing a gas into the vessel through a vent means of the vessel so as to increase the pressure inside the vessel from the reduced pressure therein to inhibit the boiling of the nitric acid, thereby to displace from partially enclosed cavities in the cut length during the reduced pressure portions of the cycles gas evolved from contact of the nitric acid with the nuclear material.

* * * * *